United States Patent [19]

Caddell

[11] 4,407,324

[45] Oct. 4, 1983

[54] VALVE STEM COVER APPARATUS

[76] Inventor: John P. Caddell, 2310 W. George, Zachary, La. 70791

[21] Appl. No.: 234,920

[22] Filed: Feb. 17, 1981

[51] Int. Cl.³ .............................................. F16K 27/08
[52] U.S. Cl. ..................................... 137/382; 251/266
[58] Field of Search .............................. 137/377, 382; 74/424.8 VA; 251/266

[56] References Cited

U.S. PATENT DOCUMENTS

| | | | |
|---|---|---|---|
| 1,266,246 | 5/1918 | Fulton | 137/382 |
| 1,664,694 | 4/1928 | Lovvorn | 137/382 |
| 2,578,630 | 12/1951 | Hartman | 137/382 |
| 2,816,566 | 12/1957 | Warren | 137/382 |
| 2,890,710 | 6/1959 | Hartman | 251/355 |
| 2,973,774 | 3/1961 | Clure | 137/382 |

FOREIGN PATENT DOCUMENTS 660696 4/1963 Canada ................................ 251/266

*Primary Examiner*—A. Michael Chambers
*Attorney, Agent, or Firm*—Charles C. Garvey

[57] ABSTRACT

An apparatus is provided for protecting hand operable valves which have a hand wheel attached to the valve stem. A valve stem cover is provided having an attachment to the assembly of the hand wheel and the stem, and having an open-ended nipple section on its upper end for receiving the valve stem therethrough. The nipple is provided with a plurality of laterally projecting ribbed edges. A tubular flexible, rubber-like sleeve section attaches to the nipple by frictionally engaging the ribbed edges. A cap encloses the uppermost second end of the tube section so as to encapsulate the valve stem together with the tube and the valve stem cover.

3 Claims, 3 Drawing Figures

VALVE STEM COVER APPARATUS

BACKGROUND OF THE INVENTION

1. Field of the Invention

The apparatus of the present invention relates to protection of valve stems. More particularly, the apparatus of the present invention relates to a protective cover for manual operated valve stems.

2. General Background

In any environment which utilizes the various types of large industrial valves which incorporate basically a stem and a manual hand wheel for removing the valving apparatus, in most cases these valve stems are threaded and often times are exposed to various types of corrosive environments, including dust, dirt, chemicals, or other corrosive material that may enter threads of the valve stem, and the threaded nut within the manual hand wheel, thus causing the valve stem and nut to become corroded, often times resulting in a jammed valved apparatus or, in some cases, breaking of the valve stem itself.

Several patents disclose the protection of valve stems, which include the following:

U.S. Pat. No. 2,578,630 discloses a valve shank protector with the use of a threaded cap which is mounted in an inverted position on the top of a hand wheel beneath the lock nut. The protector is then threaded into the threads which match those threads at the cap.

U.S. Pat. No. 2,890,710 issued to J. H. Hartman, entitled "Protector" discloses a metal dome which would interlock with veinette slots to a lower flange with an upper extention of the apparatus covering the valve stem itself as a protector.

U.S. Pat. No. 2,816,566 issued to C. C. Warren, entitled "Shield or protective for a valve stem" the disclosed and upper externally threaded sleeve received thereupon a threaded cap. The cap can be removed for filling the sleeve with a lubricant as the case may be.

SUMMARY OF THE PRESENT INVENTION

The apparatus of the present invention would solve the present problems in the art of protecting valve stems from corrosive environments, in a simple, and easily applicable manner. The apparatus of the present invention would have a plate mounted onto the manual hand wheel of the valving apparatus. The plate would have mounted thereupon a valve stem cover sealed to the plate on one end and having an open ended nipple at its second end for receiving a rubber hose or the like attachment. The rubber hose attachment would be of a length to accomodate the movement of a valve stem as the hand wheel would cause the valve stem to move upward, thus exposing most of the threaded portion of the valve stem. At its second end, the hose would be adapted with a plug, thus encapsulating the valve stem within the valve stem cover apparatus during its entire operation. The valve stem cover may be adapted with a grease fitting for adding lubricant to the confines of the cover.

Therefore, it an object of the present invention to provide a cover for protecting valve stems in a manually operated valving apparatus.

It is the further object of the present invention to provide a valve stem cover apparatus mountable on the hand wheel of a manual valve, and having the ability to accomodate the valve stem within the cover during the valving operation.

It is the further object of the present invention to provide an apparatus for protecting a valve stem having a removable portion adaptable to a nipple on the cover portion of the apparatus. It is still a further object of the present invention to provide a valve stem cover which encapsulates the entire valve stem from exterior corrosive elements during the valving operation.

SUMMARY OF THE DRAWINGS

For further understanding of the nature and object of the present invention, reference should be had to the following detailed description, taken in conjunction with the accompanying drawings, which like parts are given like reference numerals and wherein.

DETAILED DESCRIPTION OF THE PREFERRED EMBODIMENT

Figure 1:
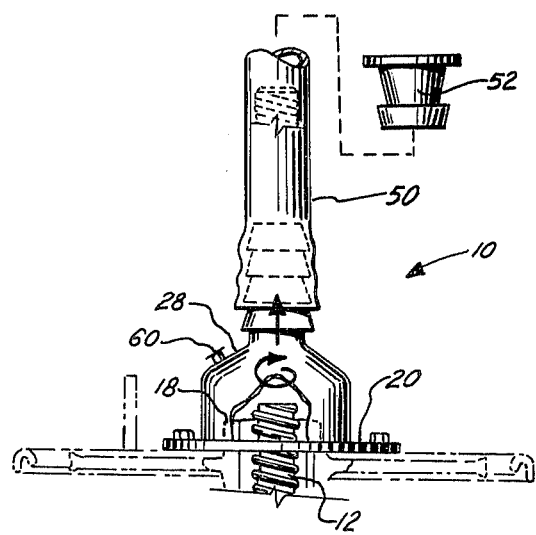
FIG. 1 is a side cut-away view of the preferred embodiment of the apparatus of the present invention.

FIG. 1 best illustrates the preferred embodiment of the apparatus of the present invention generally designated by Numeral 10. As seen in perspective cut-away view in FIG. 1, apparatus 10 is illustrated as attached to a typical hand operated valve, which would include valve stem 12 rotatable by hand-wheel 14 mounted on valve 16 by mounting nut 18. Apparatus 10 would generally provide a mounting plate 20 which would be mounted under hand-wheel 14 (FIG. 3) by removal of nut 18 and placement of mounting plate 20 under hand-wheel 14. Mounting plate 20 would be substantially circular, being of a less diameter than hand-wheel 14, thus enabling the operator of hand-wheel 14 to obtain a grasp on hand-wheel 14 during the valving operation. Mounting plate 20 would provides holes, 22 through 27, in the preferred embodiment, and being generally on the exterior diameter of mounting plate 20. Rigidly attached (preferably by bolting) to mounting plate 20, would be valve stem cover 28 conforming substantially to the circular shape of mounting plate 20. Valve stem cover 28 would have an annular lip portion 32 (FIGS. 2 and 3) for seating upon mounting plate 20, the annular lip having six holes 33 through 38 which would correspond to and align with holes 22 through 27 in mounting plate 20. Valve stem cover 28 would be rigidly mounted thereto by the use of, for example, ¼ by ¾ hex bolts 37, washer 41 and nuts 39 within the six holes provided, thus creating a mated seal between valve stem cover 28 and mounting plate 20 as best seen in FIG. 3.

Figure 3:
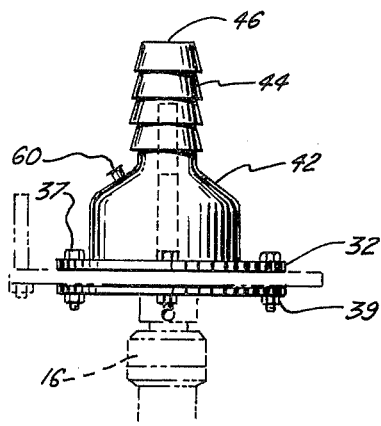
FIG. 3 is an exploded view of the valve cover portion of the preferred embodiment of the apparatus of the present invention.
Figure 2:
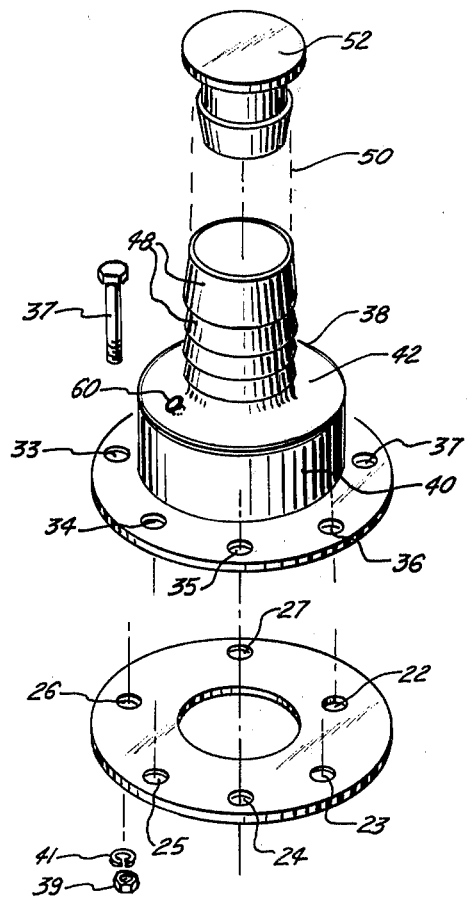
FIG. 2 illustrates a perspective view of the preferred embodiment of the apparatus of the present invention.

FIGS. 2 and 3 would illustrate the construction of valve stem cover 28, which would have vertical wall portion 40 extending upward approximately ⅛ its length, and integrating with annular shoulder wall proportion 42 which would constrict to form vertically extending nipple portion 44. In the preferred embodiment, valve stem cover 28 would be broader at its base for fitting upon mounting nut 18, and narrower at upper nipple portion 44. Nipple portion 44 would be open ended at point 46 and would be of such a diameter for receiving the width of particular valve stem 12 for movement up and downward therethrough.

FIG. 2 also illustrates nipple portion 44 being adapted with feathered edges 48 for accommodating a rubber hose 50 or the like sealably around nipple 44. Rubber hose 48 would provide further means for protective covering as the valve stem moved upward within valve stem cover 28, yet would have the ability to be removed upon twisting or pulling on the hose should easy and quick removal by required in an emergency. In the preferred embodiment, rubber hose 40 would have end plug 52 sealing its open end, thus providing the entire encapsulating of valve stem 12 and nut 18 as the valve stem 12 moves up and down during the valving operation.

In the preferred embodiment, it should be noted that valve stem cover could be adapted with grease fitting 60 or the like for insertion of lubricant into valve stem hand-wheel assembly 10 for maintaining the assembly in total lubrication during operation, yet enabling protection from the environment.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. An apparatus for protecting hand operable valves having a hand wheel attached to a valve stem forming a handwheel and stem assemble, comprising:
   a. a valve stem cover having means for securely attaching said cover to the hand wheel and stem assembly and having an open ended nipple section on its upper end for receiving the valve stem therethrough, said nipple section upper end having a plurality of laterally projecting ribbed edges;
   b. a tubular flexible rubber-like sleeve section attachable to said nipple at a first end by frictionally engaging said nipple at said ribbed edges forming a connection between said edges and said first end, the tubular section-nipple connection being a slip-on/off quick release connection;
   c. means for enclosing the second end of said tube section to encapsulate with said tube, and said cover, the valve stem.

2. The apparatus in claim 1, further comprising means for allowing lubrication within said valve stem cover.

3. The apparatus of claim 1, wherein said valve stem cover is generally bell shaped having an enlarged diameter annular lip, a variable diameter annular shoulder and said nipple section having a small diameter nipple portion.

* * * * *